(12) United States Patent
Sakai

(10) Patent No.: US 10,197,375 B2
(45) Date of Patent: Feb. 5, 2019

(54) PROBE HEAD OF THREE-DIMENSIONAL COORDINATE MEASURING DEVICE AND TOUCH DETECTION METHOD

(71) Applicant: MITUTOYO CORPORATION, Kanagawa (JP)

(72) Inventor: Hisayoshi Sakai, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 164 days.

(21) Appl. No.: 15/427,576

(22) Filed: Feb. 8, 2017

(65) Prior Publication Data
US 2017/0227345 A1 Aug. 10, 2017

(30) Foreign Application Priority Data

Feb. 10, 2016 (JP) .................................. 2016-023604

(51) Int. Cl.
*G01B 5/016* (2006.01)
*G01B 7/012* (2006.01)

(52) U.S. Cl.
CPC ............. *G01B 5/016* (2013.01); *G01B 7/012* (2013.01)

(58) Field of Classification Search
CPC ........ G01B 5/008; G01B 5/012; G01B 5/016; G01B 7/008; G01B 7/012; G01B 7/016
USPC .......................................................... 33/503
See application file for complete search history.

(56) References Cited

U.S. PATENT DOCUMENTS

| 4,397,188 A * | 8/1983 | Bansevichus et al. ..................... G01B 7/012 33/561 |
| 5,524,354 A * | 6/1996 | Bartzke et al. ........ G01B 7/012 33/558 |
| 6,198,298 B1 * | 3/2001 | Nishioki ................ G01B 5/012 324/754.1 |
| 6,307,084 B1 * | 10/2001 | Matsuki et al. ....... G01B 7/012 33/503 |
| 6,457,366 B1 * | 10/2002 | Hidaka et al. ......... G01B 5/012 73/634 |
| 7,228,642 B2 * | 6/2007 | Enderle et al. ........ G01B 7/012 33/558 |

(Continued)

FOREIGN PATENT DOCUMENTS

| JP | 2004-117225 | 4/2004 | |
| JP | 3140476 U * | 3/2008 | ............. G01B 5/012 |

(Continued)

*Primary Examiner* — R. A. Smith
(74) *Attorney, Agent, or Firm* — Greenblum & Bernstein, P.L.C.

(57) ABSTRACT

A probe head of a three-dimensional coordinate measuring device according to an embodiment of the present invention includes a measurer, a first and second diaphragm, a first oscillator, and a second oscillator. The measurer extends in a first direction. The first and second diaphragms are provided at two different positions on the measurer, at a first position and a second position, respectively, and support the measurer such that the measurer is capable of displacement in a first direction. The first oscillator causes the measurer to oscillate along the first direction. The second oscillator causes a predetermined portion of the measurer between the first and second diaphragms to oscillate along each of a second direction orthogonal to the first direction, and a third direction orthogonal to both the first and second directions.

13 Claims, 10 Drawing Sheets

(56) References Cited

U.S. PATENT DOCUMENTS

| | | | | |
|---|---|---|---|---|
| 7,318,285 | B2 * | 1/2008 | Matsumiya et al. ... | G01B 7/008 33/558 |
| 7,647,706 | B2 * | 1/2010 | Jordil et al. ......... | G01B 21/045 33/503 |
| 8,549,899 | B2 * | 10/2013 | Igasaki et al. ........ | G01B 3/008 73/105 |
| 2009/0207403 | A1 * | 8/2009 | Nemoto et al. ........ | G01B 5/008 356/124 |
| 2016/0258744 | A1 * | 9/2016 | Shimaoka et al. ..... | G01B 11/14 |

FOREIGN PATENT DOCUMENTS

| | | | | | |
|---|---|---|---|---|---|
| JP | | 2010071798 A | * | 4/2010 | ............ G01B 5/016 |
| JP | | 2017142161 A | * | 8/2017 | ............ G01B 5/016 |

* cited by examiner

Z direction displacement
of ball tip

Contact displacement vector

Contact displacement vector Z =
contact displacement vector XYZ

Trajectory of ball tip as viewed from Z direction

Y direction displacement of target cube

X direction displacement of target cube

PROBE HEAD OF THREE-DIMENSIONAL COORDINATE MEASURING DEVICE AND TOUCH DETECTION METHOD

CROSS-REFERENCE TO RELATED APPLICATIONS

The present application claims priority under 35 U.S.C. § 119 of Japanese Application No. 2016-023604, filed on Feb. 10, 2016, the disclosure of which is expressly incorporated by reference herein in its entirety.

BACKGROUND OF THE INVENTION

1. Field of the Invention

The present invention relates to a probe head of a three-dimensional coordinate measuring device and to a touch detection method detecting contact with an object.

2. Description of Related Art

Conventionally, coordinate measuring devices, surface texture measuring devices, and the like are known as examples of measuring devices measuring a shape or dimension of a measured object/measureable object/object to be measured. For example, an orthogonal XYZ coordinate system is configured in a measurement space where a measured object is placed. By scanning a touch detection-type probe or the like over the measured object, coordinate values of a surface of the measured object are detected. Based on the detected coordinate values, the shape or the like of the measured object can be measured.

In a three-dimensional coordinate measuring device according to Japanese Patent Laid-open Publication No. 2004-117225, three actuators are respectively provided on each axis so as to displace a contact-type probe along each XYZ axis direction. A ball tip of the probe performs simple oscillation in a plane configured by any two of the three XYZ axes, the oscillation caused by driving two of the actuators corresponding to the two noted axes. The remaining actuator is driven such that the ball tip moves in a circular motion in a plane configured by the remaining axis and an oscillation direction of the simple oscillation. In this state, the ball tip contacts the measured object, and accordingly a contact direction is also detected simultaneously with the contact (Japanese Patent Laid-open Publication No. 2004-117225 specification paragraphs [0014] to [0022], FIG. 1, etc.).

In a three-dimensional coordinate measuring device such as that described above, when sensitivity of the contact detection by the contact-type probe varies dependent on the direction of contact with the contacted object, measurement accuracy of the shape or the like may decrease.

SUMMARY OF THE INVENTION

In view of this, the present invention provides a probe head of a three-dimensional coordinate measuring device and a touch detection method capable of stable touch detection not dependent on contact direction.

According to one aspect of the present invention, the probe head of the three-dimensional coordinate measuring device includes a measuring member/measurer, a first and second diaphragm, a first oscillating mechanism/oscillator, and a second oscillating mechanism/oscillator. The measuring member extends in a first direction. The first and second diaphragms are provided at two different positions on the measuring member, at a first position and a second position, respectively, and support the measuring member such that the measuring member is capable of displacement in the first direction. The first oscillating mechanism causes the measuring member to oscillate along the first direction. The second oscillating mechanism causes a predetermined portion of the measuring member between the first and second diaphragms to oscillate along each of a second direction orthogonal to the first direction, and a third direction orthogonal to both the first and second directions.

In the probe head of the three-dimensional coordinate measuring device, the measuring member, which is supported by the first and second diaphragms, is oscillated along the first direction by the first oscillating mechanism. The predetermined portion between the first and second diaphragms is oscillated along each of the second and third directions by the second oscillating mechanism. Accordingly, stable contact detection that is not dependent on contact direction is possible.

The measuring member may also include a ball tip provided to a forefront end of the measuring member. In such a case, the second oscillating mechanism may also oscillate the predetermined portion of the measuring member such that the ball tip makes a circular motion in a plane orthogonal to the first direction. Accordingly, highly accurate contact detection that is not dependent on contact direction is possible.

The predetermined portion may also be a middle portion between the first and second diaphragms. Accordingly, motion of the ball tip can be accurately controlled.

The first and second oscillating mechanisms may also cause the measuring member to oscillate without touching the measuring member. Accordingly, contact can be stabilized and detected with a high degree of accuracy.

The second oscillating mechanism may also include a first oscillation applier causing the predetermined portion to oscillate along the second direction; and a second oscillation applier causing the predetermined portion to oscillate along the third direction. Accordingly, the predetermined portion of the measuring member can be accurately oscillated along each of the second and third directions.

The first oscillating mechanism may also cause the measuring member to oscillate at a first frequency. In such a case, the first and second oscillation appliers may also cause the predetermined portion to oscillate at a second frequency lower than the first frequency. Accordingly, contact can be stabilized and detected with a high degree of accuracy.

The first oscillation applier may also cause the predetermined portion to oscillate in a sine wave shape. In such a case, the second oscillation applier may also cause the predetermined portion to oscillate in a sine wave shape such that a phase of the oscillation differs by 90° from the oscillation caused by the first oscillation applier. Accordingly, the ball tip of the measuring member(measurer) can be readily moved in a circular motion.

The probe head of the three-dimensional coordinate measuring device may further include a first detection mechanism/detector detecting displacement of the measuring member in the first direction; and a second detection mechanism/detector detecting displacement of the predetermined portion in each of the second and third directions. Based on detection results of the first and second detection mechanisms, contact can be stabilized and detected with a high degree of accuracy. The contact direction can also be detected.

The first and second detection mechanisms may also detect displacement of the measuring member without touching the measuring member. Accordingly, contact can be stabilized and detected with a high degree of accuracy.

The second detection mechanism may also include a first displacement sensor detecting displacement of the predetermined portion in the second direction; and a second displacement sensor detecting displacement of the predetermined portion in the third direction. Accordingly, displacement in the second and third directions can be detected with a high degree of accuracy.

The first oscillating mechanism may also cause the measuring member to oscillate in a state where a force is applied to the measuring member from one end side of the measuring member contacting a measured object/measureable object/object to be measured toward an opposite end side of the measuring member. Accordingly, the measuring member can be kept in balance in the first direction.

A touch detection method according to another aspect of the present invention includes supporting the measuring member such that the measuring member is capable of displacement in the first direction, the measuring member extending in the first direction and supported by the first and second diaphragms which are provided at two different positions, at the first position and the second position, respectively, on the measuring member. The measuring member is oscillated along the first direction. The predetermined portion of the measuring member between the first and second diaphragms is oscillated along each of the second direction orthogonal to the first direction, and the third direction orthogonal to both the first and second directions. The ball tip provided to the forefront end of the measuring member is displaced toward the measured object. Contact between the ball tip and the measured object is detected based on displacement of the measuring member in the first direction and displacement of the predetermined portion in each of the second and third directions. With this touch detection method, stable contact detection that is not dependent on the contact direction is possible.

The contact detection may also detect a direction of the contact of the ball tip with the measured object based on displacement of the measuring member in the first direction and displacement of the predetermined portion in each of the second and third directions. With this touch detection method, the contact direction can be detected with a high degree of accuracy.

As noted above, stable contact detection that is not dependent on the contact direction is possible according to the present invention. It is noted that the effects of the present invention described herein are not necessarily limited, and may be at least one of the effects disclosed herein.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

An embodiment of the present invention is described below with reference to the drawings.

Shape Measuring Apparatus

Figure 1:
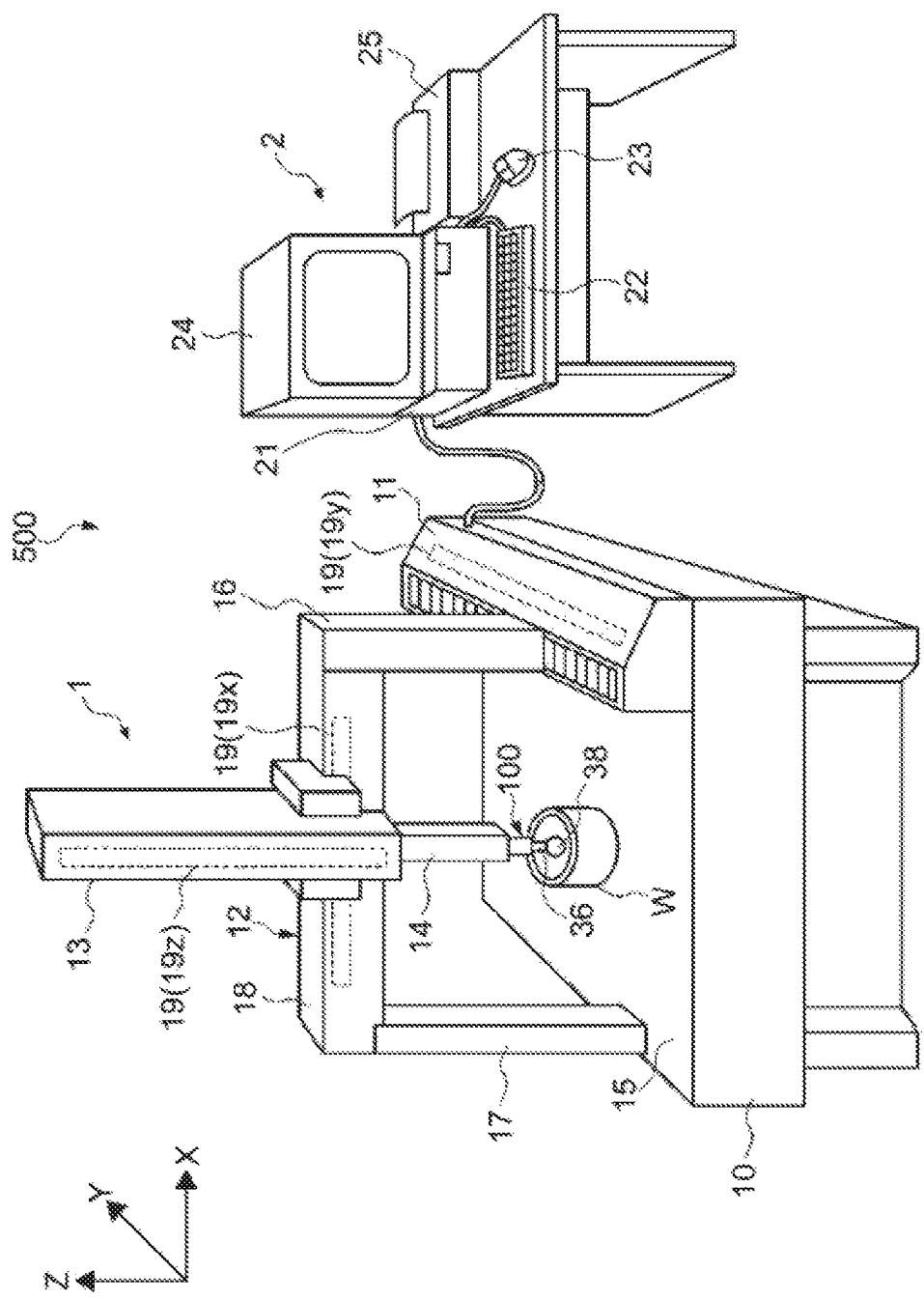
FIG. 1 is a schematic view illustrating an exemplary configuration of a shape measuring apparatus according to an embodiment of the present invention.

FIG. 1 is a schematic view illustrating an exemplary configuration of a shape measuring apparatus according to an embodiment of the present invention. A shape measuring apparatus 500 includes a three-dimensional coordinate measuring device 1 and a computer 2.

The three-dimensional coordinate measuring device 1 includes a stage 10, a Y axis drive mechanism 11, a Y bridge 12, an X carriage 13, and a Z ram 14. The stage 10 has a base surface 15 upon which a measured object W is placed. The base surface 15 is installed so as to be parallel to a horizontal plane (XY plane in FIG. 1). The Y axis drive mechanism 11 is installed at one end of X direction on the stage 10 so as to extend in a Y direction.

The Y bridge 12 is a gate-shaped structure and includes a Y column 16, a Y supporter 17, and an X beam 18. The Y column 16 is installed above the Y axis drive mechanism 11 so as to extend in a vertical direction (Z direction). The Y supporter 17 is installed opposite the Y column 16 in the X direction, on a second end above the stage 10. A bottom end of the Y supporter 17 is supported by an air bearing or the like so as to be capable of displacement in the Y direction.

The X beam 18 extends in the X direction and is supported at both ends by the Y column 16 and the Y supporter 17, respectively. When the Y axis drive mechanism 11 is activated, the Y column 16, Y supporter 17, and X beam 18 integrally displace in the Y direction.

The X carriage 13 is installed on the X beam 18 so as to extend in the X direction. The X carriage 13 is configured so as to be capable of displacement in the X direction, relative to the X beam 18, using an X axis drive mechanism (not shown in the drawings) provided to the X beam 18.

The Z ram 14 is installed on the X carriage 13 so as to extend in the Z direction. The Z ram 14 is configured so as to be capable of displacement in the Z direction, relative to the X carriage 13, using a Z axis drive mechanism (not shown in the drawings) provided to the X carriage 13.

A probe head 100 is mounted to a bottom end of the Z ram 14. The Y axis drive mechanism 11, as well as X axis and Z axis drive mechanisms, are controlled by the computer 2, which enables the probe head 100 to scan within a measurement coordinate space configured by the three axes (XYZ).

In addition, a linear encoder 19 which detects displacement of the probe head 100 is installed in the three-dimensional coordinate measuring device 1. When the probe head 100 performs a scan, the linear encoder 19 outputs displacement amount and position data for each of the X, Y, and Z directions.

The linear encoder 19 includes an X axis linear encoder 19x, a Y axis linear encoder 19y, and a Z axis linear encoder 19z. The X axis linear encoder 19x is provided on the X beam 18 and detects an amount of X direction displacement of the X carriage 13. The Y axis linear encoder 19y is provided near the Y axis drive mechanism 11 and detects an amount of Y direction displacement of the Y bridge 12. The Z axis linear encoder 19z is provided on the X carriage 13 and detects an amount of Z direction displacement of the Z ram 14.

A stylus (stylus head) 36 is detachably attached to the probe head 100. A spherical ball tip 38, for example, is provided to a forefront/distal end of the stylus 36. By detecting contact made by the ball tip 38 with the measured object W, a shape of the measured object W is measured by the computer 2. A detailed description of a touch detection method using the probe head 100 is provided below.

The computer 2 performs drive control of the three-dimensional coordinate measuring device 1 to import necessary measured values, and also executes computations necessary for calculating a surface texture of the measured object W. The computer 2 includes a computer main body 21, a keyboard 22, a mouse 23, a monitor 24, and a printer 25.

Probe Head

Figure 2:
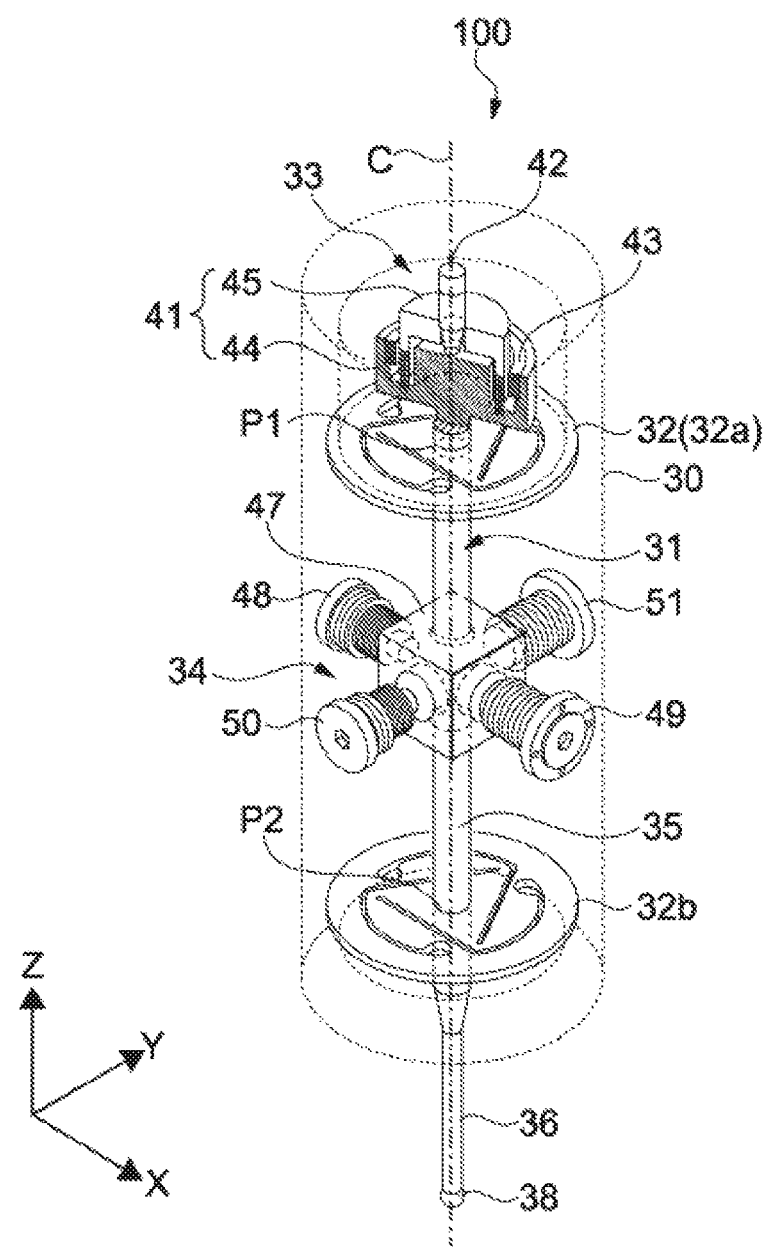
FIG. 2 is a perspective view illustrating an exemplary configuration of an interior of a probe head.
Figure 3:
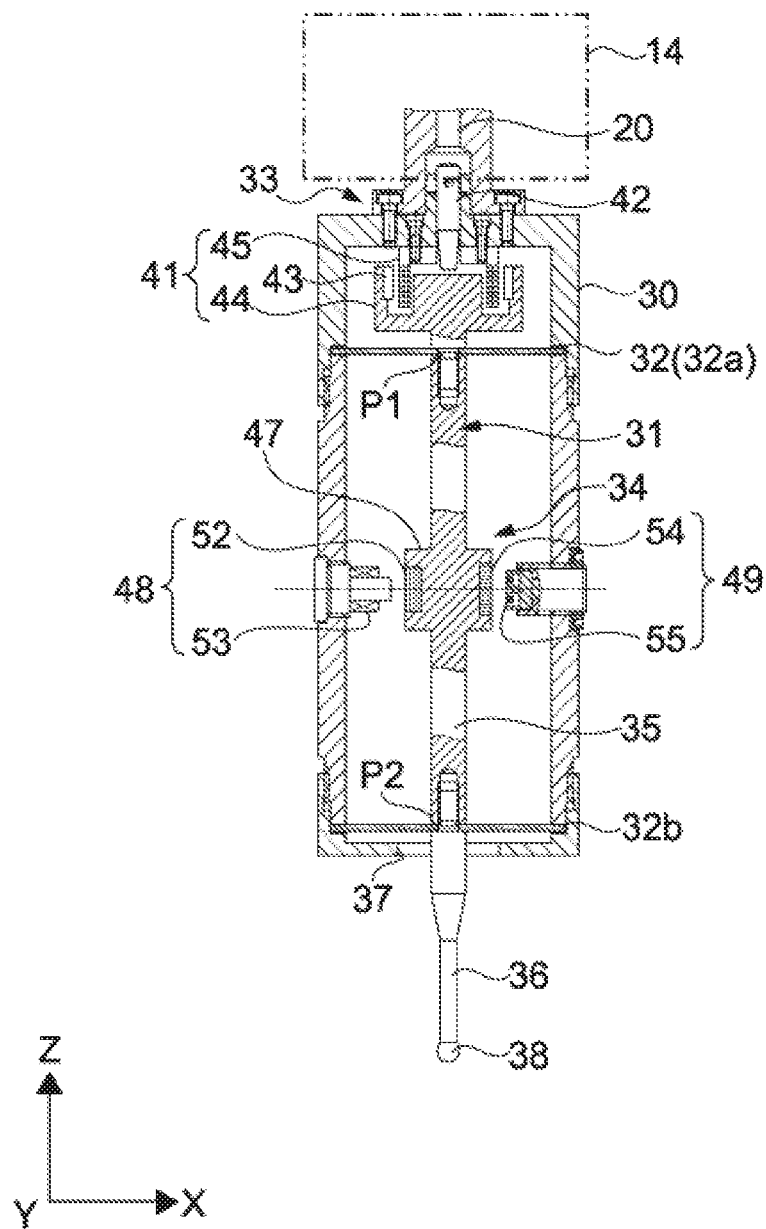
FIG. 3 is a cross-sectional view of the probe head on an XZ plane which runs through a center axis of the probe head.

FIGS. 2 and 3 are schematic views of an exemplary configuration of the probe head 100 according to the present embodiment. FIG. 2 is a perspective view illustrating an exemplary configuration of an interior of the probe head 100. FIG. 3 is a cross-sectional view of the probe head 100 on an XZ plane which runs through a center axis C of the probe head 100.

In the present embodiment, the Z direction corresponds to a first direction, and the X direction corresponds to a second direction orthogonal to the first direction. Furthermore, the Y direction corresponds to a third direction orthogonal to each of the first and second directions. To facilitate the following description, the X direction is a left/right direction, the Y direction is a front/back direction, and the Z direction is an up/down direction.

The probe head 100 includes a base frame 30, a measuring member 31, two diaphragms 32, a vertical oscillation/detection mechanism 33, and a horizontal oscillation/detection mechanism 34. The base frame 30 has a hollow, cylindrical tubular shape and is provided so as to extend in the Z direction. A top surface of the base frame 30 is connected to a probe adapter 20 provided to the bottom end of the Z ram 14.

The measuring member 31 is a pole-shaped member extending in one direction, and includes a main shaft 35 and the stylus 36. The measuring member 31 is provided at a position on the center axis C within the base frame 30, and is provided so as to extend along the Z direction. A top end of the main shaft 35 is connected to the Z oscillating mechanism 41 provided on a top surface side of the base frame 30. The stylus 36 is detachably attached to a bottom end of the main shaft 35.

As shown in FIG. 3, a through-hole 37 is formed in a bottom surface of the base frame 30. The stylus 36 passes through the through-hole 37 and is connected to the bottom end of the main shaft 35. The ball tip 38 is provided to a bottom end of the stylus 36.

The two diaphragms 32 are provided at two different positions on the measuring member 31, at a first position P1 and a second position P2, respectively. In the present embodiment, a first diaphragm 32a is provided at a connection portion with the Z oscillating mechanism 41 on the top end side of the main shaft 35 (first position P1). The second diaphragm 32b is provided at a connection portion with the stylus 36 on the bottom end side of the main shaft 35 (second position P2).

As shown in FIG. 3, in the present embodiment, a distance between the first diaphragm 32a and the second diaphragm 32b (distance between the first position P1 and the second position P2) is substantially equal to a length of the main shaft 35. A length of the stylus 36 is equal to substantially half the length of the main shaft 35.

Figure 4A:
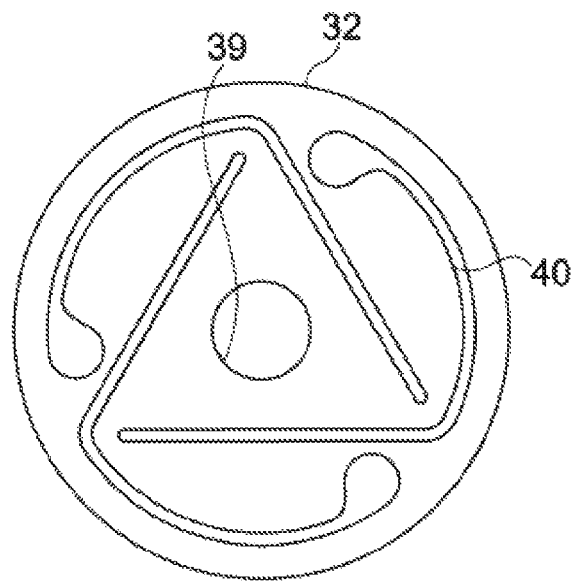
FIG. 4A is a schematic view illustrating an exemplary configuration of a diaphragm.
Figure 4B:
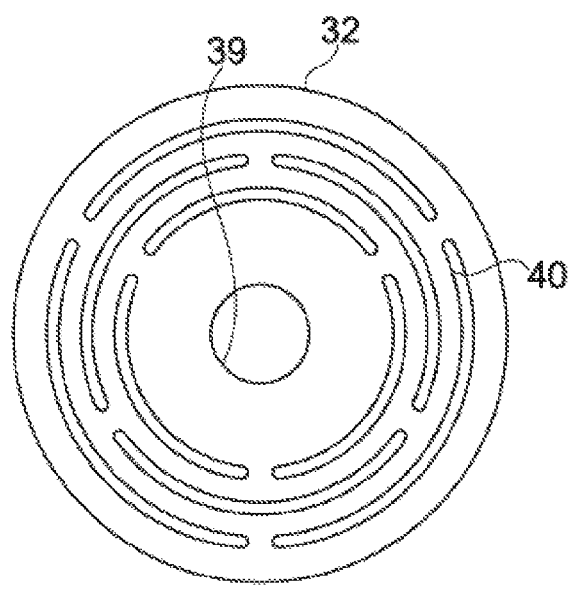
FIG. 4B is a plan view of the diaphragm in a Z direction.

FIG. 4A is a schematic view illustrating an exemplary configuration of a diaphragm 32, and FIG. 4B is a plan view of the diaphragm 32 in the Z direction. The diaphragm 32 is configured by a thin, disc-shaped plate and is formed with an elastic material. A circular opening 39 is formed at the center of the diaphragm 32, and a plurality of openings 40 having a predetermined shape are formed around the periphery of the circular opening 39.

The measuring member 31 is inserted into the central opening 39. The peripheral openings 40 are formed so as to achieve suitable elasticity with the diaphragm 32. In the diaphragm 32 shown in FIG. 4A, three openings 40 are formed having an approximate "L" shape. In the diaphragm 32 shown in FIG. 4B, the plurality of openings 40 are formed at positions concentric with the central opening 39. The type of elastic material, shape of the openings 40, and the like are not limited.

As shown in FIG. 3, the first diaphragm 32a and the second diaphragm 32b are each fixated to an inner surface of the base frame 30 by a circumferential edge of the respective diaphragm 32. In addition, the measuring member 31 is inserted through the central opening 39 of each diaphragm 32 to be mounted.

Accordingly, the main shaft 35 and the stylus 36 are supported by the first diaphragm 32a and the second diaphragm 32b so as to be capable of displacement in the Z direction. Also, rotation of the main shaft 35 and the stylus 36 is regulated by the first diaphragm 32a and the second diaphragm 32b.

In the present embodiment, elasticity and the like of the first diaphragm 32a and the second diaphragm 32b are configured such that the first diaphragm 32a and the second diaphragm 32b are parallel to the horizontal direction (XY plane direction) and not bowed in a state where the ball tip 38 is not attached. This enables highly accurate and stable touch detection.

The vertical oscillation/detection mechanism 33 includes the Z oscillating mechanism 41 and a Z displacement detection mechanism 42. The Z oscillating mechanism 41 is configured as a voice coil motor and includes a yoke 44 provided with a permanent magnet 43; and an electromagnetic coil 45 provided on the top surface of the base frame 30. As shown in FIG. 3, a bottom surface side of the yoke 44 is connected to the top end of the main shaft 35.

When electricity is supplied to the electromagnetic coil 45, the yoke 44 oscillates along the Z direction. The measuring member 31 also oscillates along the Z direction in association with the oscillation of the yoke 44. In other words, the measuring member 31 is oscillated along the Z direction by the Z oscillating mechanism 41. The configuration of the voice coil motor enables non-contact oscillation of the measuring member 31.

The Z displacement detection mechanism 42 is provided at a position on the center axis C of the base frame 30 and detects, without contact, displacement of the yoke 44 oscillating along the Z direction. A capacitance-type displacement sensor is used as the Z displacement detection mechanism 42, for example, but the present invention is not limited to this.

The Z oscillating mechanism 41 and the Z displacement detection mechanism 42 correspond to a first oscillating mechanism and first detection mechanism in the present embodiment. The specific configurations of the Z oscillating mechanism 41 and Z displacement detection mechanism 42 are not limited, and a configuration other than a voice coil motor, for example, may be used instead.

The horizontal oscillation/detection mechanism 34 includes a target cube 47, an X oscillating mechanism 48, an X displacement detection mechanism 49, a Y oscillating mechanism 50, and a Y displacement detection mechanism 51. The target cube 47 has substantially a cube shape and is provided to a middle portion of the main shaft 35 (a middle portion between the first diaphragm 32a and the second diaphragm 32b).

The target cube 47 is provided such that the six surfaces of the cube respectively intersect at right angles with the X, Y, and Z directions. In other words, a top surface and bottom surface intersect at right angles with the Z direction, a right surface and left surface intersect at right angles with the X direction, and a front surface and back surface intersect at right angles with the Y direction.

As shown in FIG. 3, the X oscillating mechanism 48 includes a coin-shaped permanent magnet 52 provided to a left surface of the X oscillating mechanism 48 and an electromagnetic coil 53 provided to the base frame 30 opposite the permanent magnet 52. When electricity is supplied to the electromagnetic coil 53, the target cube 47 oscillates along the X direction. In other words, the X oscillating mechanism enables non-contact oscillation of the middle portion of the main shaft 35 along the X direction.

The X displacement detection mechanism 49 is configured as an inductance-type displacement gauge and includes a ferrite core 54 provided on a right surface of the X displacement detection mechanism 49 and an inductance coil 55 provided to the base frame 30 opposite the ferrite core 54. The X displacement detection mechanism 49 enables non-contact detection of the displacement of the target cube 47 in the X direction (displacement of the middle portion of the main shaft 35).

The Y oscillating mechanism 50 and Y displacement detection mechanism 51 have configurations substantially identical to those of the X oscillating mechanism 48 and the X displacement detection mechanism 49, respectively, and are arranged opposite each other in the Y direction. The Y oscillating mechanism 50 enables non-contact oscillation of the target cube 47 in the Y direction. The Y displacement detection mechanism 51 enables non-contact detection of the displacement of the target cube 47 in the Y direction.

The X oscillating mechanism 48 and the X displacement detection mechanism 49 correspond to a first oscillation applier and first displacement sensor in the present embodiment. The Y oscillating mechanism 50 and the Y displacement detection mechanism 51 correspond to a second oscillation applier and second displacement sensor in the present embodiment.

Also, a second oscillating mechanism according to the present embodiment is configured by the X oscillating mechanism 48 and Y oscillating mechanism 50. A second detection mechanism according to the present embodiment is configured by the X displacement detection mechanism 49 and Y displacement detection mechanism 51. The specific configurations of the X oscillating mechanism 48, X displacement detection mechanism 49, Y oscillating mechanism 50, and Y displacement detection mechanism 51 are not limited and may designed as desired.

Figure 5:
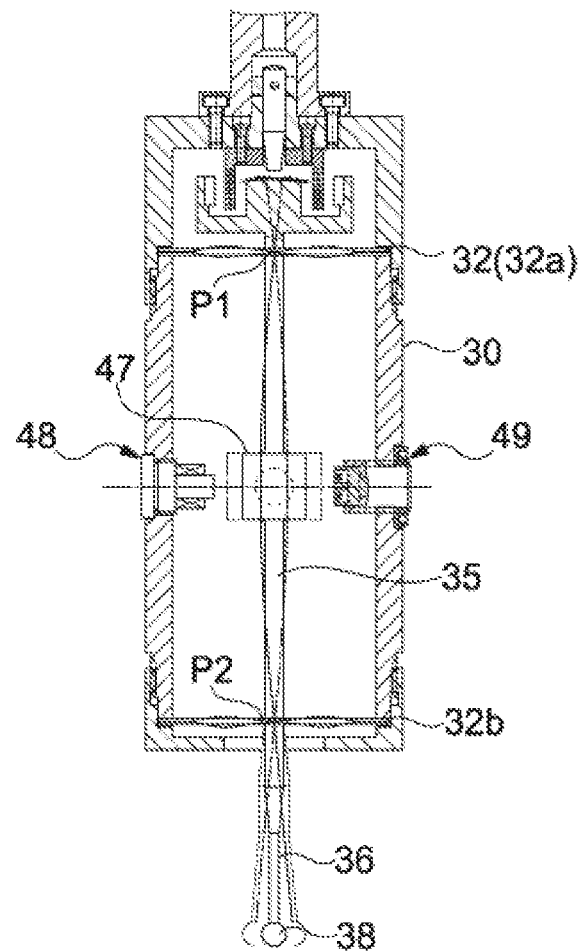
FIG. 5 is a schematic view illustrating movement in a case where an X oscillating mechanism is operated.

FIG. 5 is a schematic view illustrating movement in a case where the X oscillating mechanism 48 is operated. Due to the X oscillating mechanism 48, a force acts on the target cube 47 in the X direction. The main shaft 35 elastically deforms into a bow shape with the first position P1 (where the first diaphragm 32a is provided) and the second position P2 (where the second diaphragm 32b is provided) on the main shaft 35 as pivot points.

For example, when magnetic repulsion occurs between the electromagnetic coil 53 and the permanent magnet 52, the target cube 47 displaces rightward along the X direction (X axis plus direction). The main shaft 35 elastically deforms accordingly and the ball tip 38 of the stylus 36 displaces leftward (minus direction) along the X direction.

When magnetic attraction occurs between the electromagnetic coil 53 and the permanent magnet 52, the target cube 47 displaces leftward (minus direction) along the X direction. The ball tip 38 of the stylus 36 accordingly displaces rightward (plus direction) along the X direction.

When the X oscillating mechanism 48 is operated and the target cube 47 is displaced in this way, the ball tip 38 displaces in a direction opposite that of the target cube 47 displacement. An amount of displacement of the ball tip 38 corresponds to the amount of displacement of the target cube 47. Accordingly, by controlling the electricity supplied to the electromagnetic coil 53, the amount of displacement of the ball tip 38 can be controlled.

As shown in FIG. 5, in the present embodiment, the target cube 47 is provided to a middle portion between the first position P1 and the second position P2 (the pivot points). In other words, the first diaphragm 32a and the second diaphragm 32b are provided at symmetrical positions in the Z direction with respect to the middle portion that is forced to displace.

By controlling oscillation force from the X oscillating mechanism 48 in this way, displacement of the target cube 47 can be accurately controlled. As a result, displacement of the ball tip 38 can also be controlled with a high degree of accuracy.

The length of the stylus 36 is substantially half the length of the main shaft 35, and therefore the second diaphragm 32b is positioned substantially at a center location between the target cube 47 and the ball tip 38. Accordingly, with the second position P2 as the pivot point, the displacement of the target cube 47 substantially corresponds to the displacement of the ball tip 38. In this respect also, displacement of the ball tip 38 can be controlled with a high degree of accuracy.

The oscillation of the target cube 47 due to the Y oscillating mechanism 50 is similar. When magnetic attraction occurs, the target cube 47 displaces forward along the Y direction (Y axis minus direction). The ball tip 38 accordingly displaces rearward (plus direction) along the Y direction. When magnetic repulsion occurs, the target cube 47 displaces rearward (plus direction) along the Y direction. The ball tip 38 accordingly displaces forward (minus direction) along the Y direction.

Figure 6:
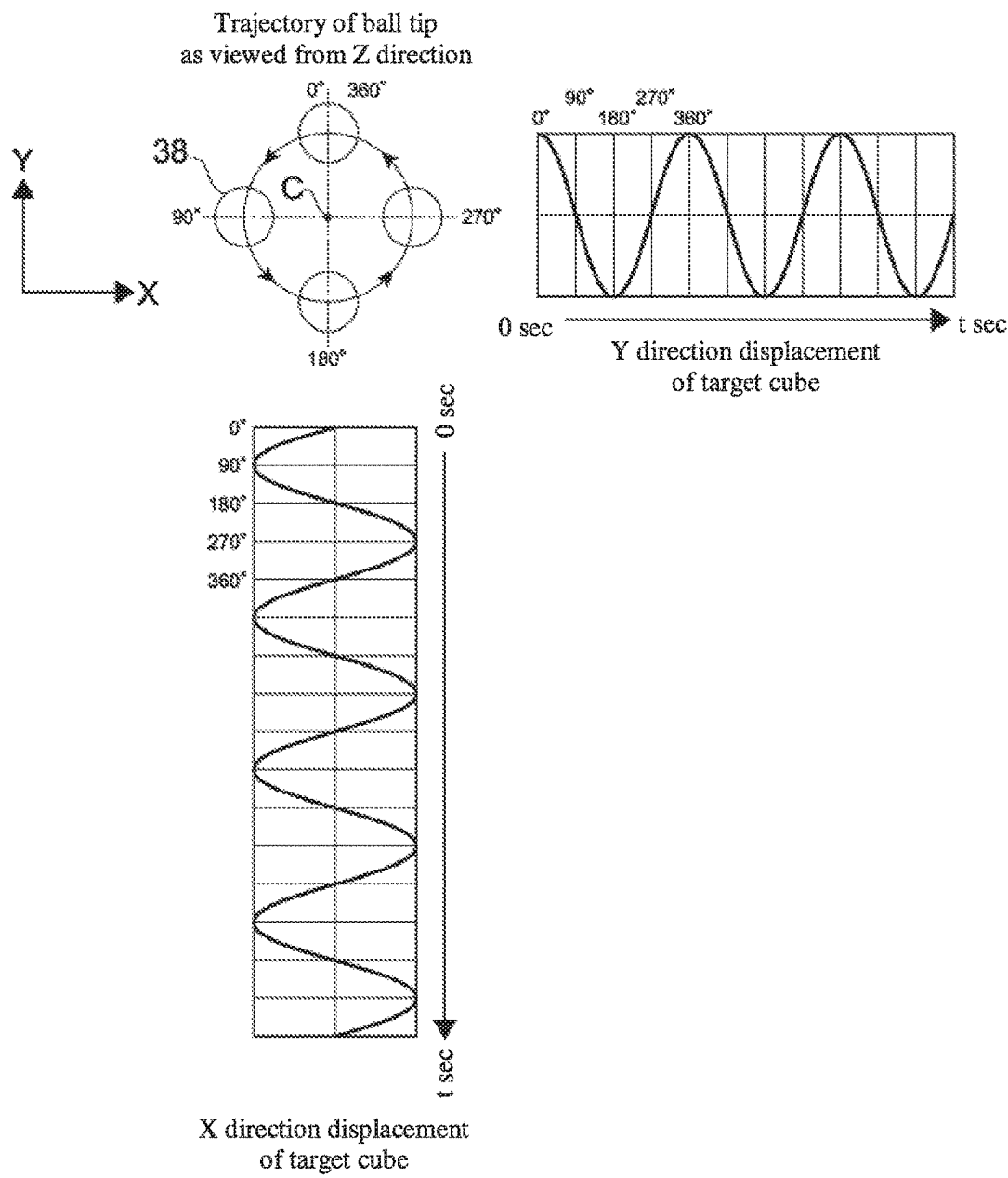
FIG. 6 illustrates an exemplary oscillation of a target cube, induced by the X oscillating mechanism and a Y oscillating mechanism.

FIG. 6 is a schematic view illustrating an exemplary oscillation of the target cube 47, induced by the X oscillating mechanism 48 and the Y oscillating mechanism 50. As shown in FIG. 6, due to the X oscillating mechanism 48, the target cube 47 oscillates in a sine wave along the X direction. Due to the Y oscillating mechanism 50, the target cube 47 oscillates in a sine wave along the Y direction at the same frequency as the X direction oscillation, with the phase differing by 90°. Accordingly, the target cube 47 makes a circular motion centered on the center axis C on the XY plane. The ball tip 38 also makes a corresponding circular motion centered on the center axis C on the XY plane.

The circular motion of the target cube 47 (ball tip 38) can be easily achieved by applying sine wave-shaped voltage to the electromagnetic coil 53 of the X oscillating mechanism 48 and the electromagnetic coil of the Y oscillating mechanism 50 such that the phase is mutually offset by 90°.

In the present embodiment, due to the Z oscillating mechanism 41, the ball tip 38 oscillates in a sine wave shape along the Z direction at a predetermined frequency fz (Hz) and amplitude Az (μm). Also, due to the X oscillating mechanism 48 and Y oscillating mechanism 50, the ball tip 38 oscillates in a circular motion at the same frequency fxy (Hz) and amplitude Axy (μm) for both mechanisms.

The frequency fz (Hz) and amplitude Az (μm) are set in a range of, for example, 1000 Hz to 750 Hz and 1.5 μm to 3 μm. The frequency fxy (Hz) and amplitude Axy (μm) are set in a range of, for example, 500 Hz to 300 Hz and 3 μm to 5 μm. Of course, the present invention is not limited to these ranges, which may be configured as appropriate.

In the present embodiment, the frequency fz (Hz) is defined to be larger than the frequency fxy (Hz). Specifically, oscillation frequency in the Z direction is defined to be larger than the oscillation frequency in either of the X and Y directions. In particular, by defining the frequency fz (Hz) to a value more than root 2 times larger than the frequency fry (Hz), sympathetic oscillation of the oscillation in the Z direction and the oscillation in the XY plane (circular motion) can be inhibited. Accordingly, contact can be stabilized and detected with a high degree of accuracy. Also, each oscillation frequency may instead be defined based on a natural frequency in each direction, for example.

The measuring member 31, which extends in the Z direction, is readily oscillated at a high frequency, and therefore the frequency fz (Hz) can also be readily defined to be larger than the frequency fxy (Hz).

Displacement of the yoke 44 along the Z direction can be detected by the Z displacement detection mechanism 42, as described above. In addition, displacement of the target cube 47 on the XY plane can be detected by the X displacement detection mechanism 49 and the Y displacement detection mechanism 51. These displacements correspond to the displacement of the ball tip 38. In other words, displacement of the ball tip 38 in each direction can be detected by each of the X, Y, and Z displacement detection mechanisms.

Contact with the measured object W and a direction of such contact are detected based on a change in the displacement detected by each of the X, Y, and Z displacement detection mechanisms (i.e., a change in an oscillation state). Typically, a normal direction at a contact point where the ball tip 38 touches the measured object W is detected as the contact direction.

In the present embodiment, an amount of amplitude reduction $\Delta x$, $\Delta y$, and $\Delta z$ of the ball tip 38 displacement in each of the X, Y, and Z directions is calculated. The amplitude reduction amounts $\Delta x$, $\Delta y$, and $\Delta z$ correspond to the size of the displacement of the ball tip 38 in each direction due to contact. In other words, the amplitude reduction amounts $\Delta x$, $\Delta y$, and $\Delta z$ correspond to a depression amount of the ball tip 38 due to the measured object W. Also, as described hereafter, a calculation is performed in each direction to determine the orientation from which the measured object W touched the ball tip 38. In other words, the orientation of the contact is calculated.

Based on the calculated reduction amounts $\Delta x$, $\Delta y$, and $\Delta z$ and the contact orientation, contact displacement vectors X, Y, and Z are generated which represent displacement of the ball tip 38 due to contact in each direction. The larger the amplitude reduction amounts $\Delta x$, $\Delta y$, and $\Delta z$, the larger the contact displacement vectors X, Y, and Z.

By compiling the contact displacement vectors X, Y, and Z in each direction, a contact displacement vector XYZ is generated which represents displacement of the ball tip 38 due to contact in XYZ space. Based on the size, direction, and orientation magnitude of the contact displacement vector XYZ, the displacement magnitude (depression amount), contact direction, and contact orientation of the ball tip 38 due to contact are calculated.

The depression amount is calculated by the square root sum of squares of $\Delta x$, $\Delta y$, and $\Delta z$: $(\Delta x^2+\Delta y^2+\Delta z^2)^{1/2}$. For example, when the square root sum of squares of $\Delta x$, $\Delta y$, and $\Delta z$: $(\Delta x^2+\Delta y^2+\Delta z^2)^{1/2}$ is larger than a predetermined threshold value, the computer 2 determines that contact has occurred. In other words, contact with the measured object W is detected. This threshold value is not limited and may be defined as appropriate.

Figure 7:
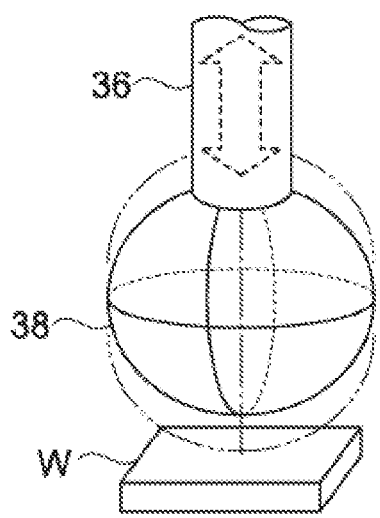
FIG. 7 is a schematic view illustrating an exemplary detection of displacement of a ball tip by a Z displacement detection mechanism.
Figure 7:
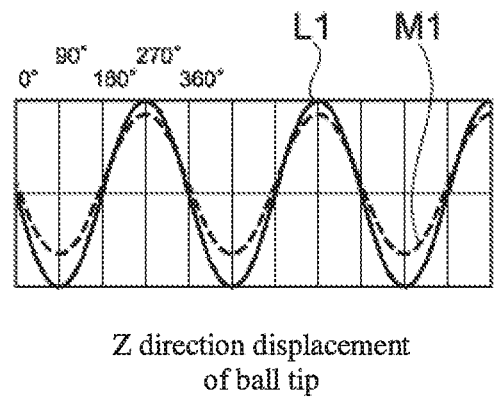
Figure 7:

Hereafter, concrete examples are given with a description of calculating the depression amount, contact direction, and contact orientation. FIG. 7 is a schematic view illustrating a case where the ball tip 38 touches the measured object W along the Z direction. FIG. 7 depicts only oscillation along the Z direction and does not show circular motion on the XY plane.

For example, in a non-contact state where the ball tip 38 is not touching the measured object W, displacement of the ball tip 38 oscillating in a sine wave shape along the Z direction is detected (solid line L1). When the ball tip 38 touches the measured object W, the amplitude Az of the ball tip 38 displacement along the Z direction becomes smaller (dashed line M1). Contact is detected when the square root sum of squares of $\Delta x$, $\Delta y$, and $\Delta z$ $(\Delta x^2+\Delta y^2+\Delta z^2)^{1/2}$ exceeds a predetermined threshold value, as described above (in the example of FIG. 7, $\Delta x=\Delta y=0$).

As shown by the dashed line M1 in FIG. 7, an amount of reduction in the amplitude Az on a side touching the measured object W (in the example shown in FIG. 7, reduction amount of the amplitude Az from 0° to 180°) is greater than the amount of reduction in the amplitude Az on a side not touching the measured object W (reduction amount of the amplitude Az from 180° to 360°). Accordingly, a value of the greater reduction amount is used as $\Delta z$. Contact can thus be detected with a high degree of accuracy.

The ball tip 38 touches the measured object W by moving downward from above in the Z direction. Therefore, the orientation of the contact displacement vector Z is upward.

Also, because $\Delta x=\Delta y=0$, the contact displacement vector Z is equal to the contact displacement vector XYZ. Accordingly, the depression amount, contact direction, and contact orientation are the size of $\Delta z$, the Z direction, and upward, respectively.

Figure 8:
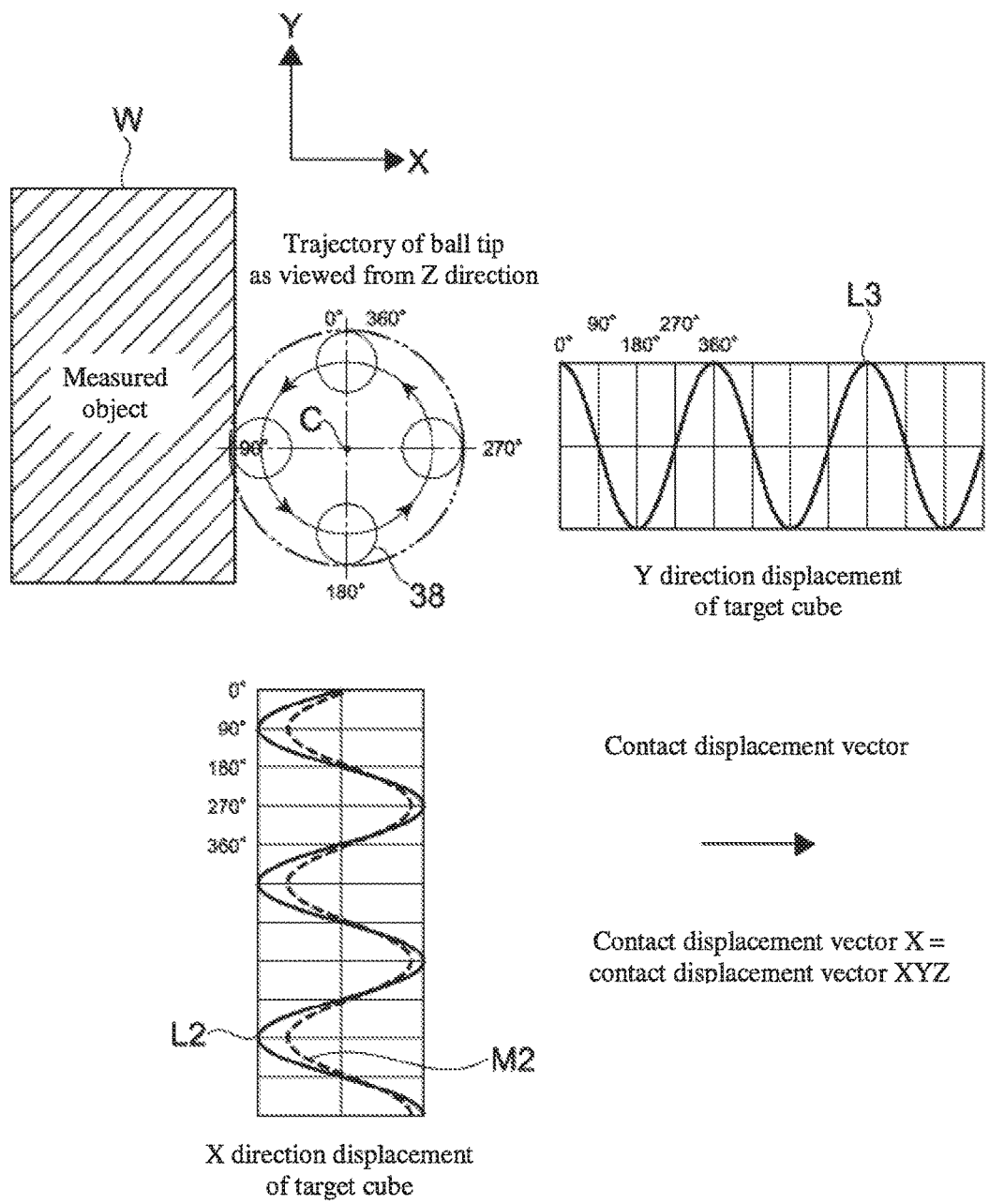
FIG. 8 is a schematic view illustrating an exemplary detection of displacement of the ball tip by an X displacement detection mechanism and Y displacement detection mechanism.

FIG. 8 is a schematic view illustrating a case where the ball tip 38 touches the measured object W along the X direction. In a case where the ball tip 38 is in a non-contact state, sine wave-shaped oscillation of the ball tip 38 is detected in the X and Y directions (solid lines L2 and L3). When the ball tip 38 touches the measured object W, the amplitude Ax of the displacement along the X direction of the ball tip 38 becomes smaller (dashed line M2). Meanwhile, in the Y direction, the amplitude Ay of the displacement is not reduced.

Contact is detected when the square root sum of squares of $\Delta x$, $\Delta y$, and $\Delta z$ $(\Delta x^2+\Delta y^2+\Delta z^2)^{1/2}$ exceeds the predetermined threshold value ($\Delta y=\Delta z=0$). A value of the greater reduction amount is used as the reduction amount $\Delta x$.

The contact orientation in the X direction is calculated based on the amplitude direction (orientation) of the side having the larger reduction amount $\Delta x$. In the example shown in FIG. 8, the reduction amount $\Delta x$ in a case where the ball tip 38 oscillates from the center axis C leftward (X axis minus direction) is larger. Therefore, the measured object W is detected as being to the left of the ball tip 38. Accordingly, a rightward orientation (X axis plus direction) is calculated as the contact orientation.

As shown in FIG. 8, because $\Delta y=\Delta z=0$, the contact displacement vector X is equal to the contact displacement vector XYZ. Accordingly, the depression amount, contact direction, and contact orientation are the size of $\Delta x$, the X direction, and rightward, respectively.

Even in a case where the ball tip 38 touches the measured object W along the Y direction, the depression amount, contact direction, and contact orientation can be calculated similarly to the example shown in FIG. 8.

Figure 9:
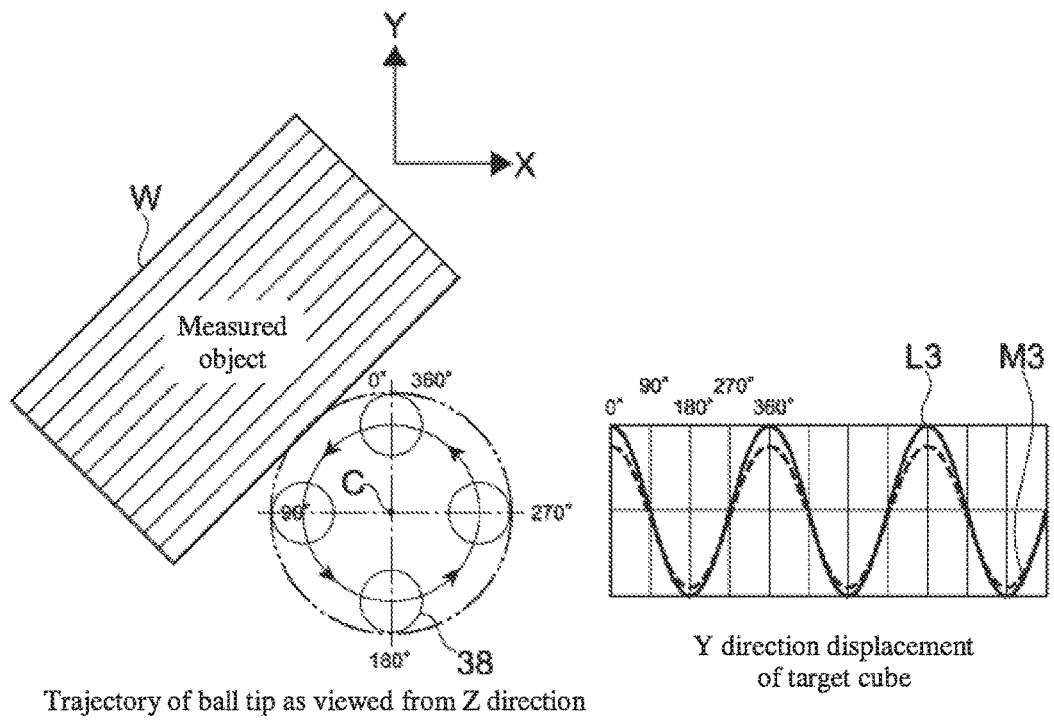
FIG. 9 illustrates another exemplary detection of displacement by the X displacement detection mechanism and Y displacement detection mechanism.
Figure 9:
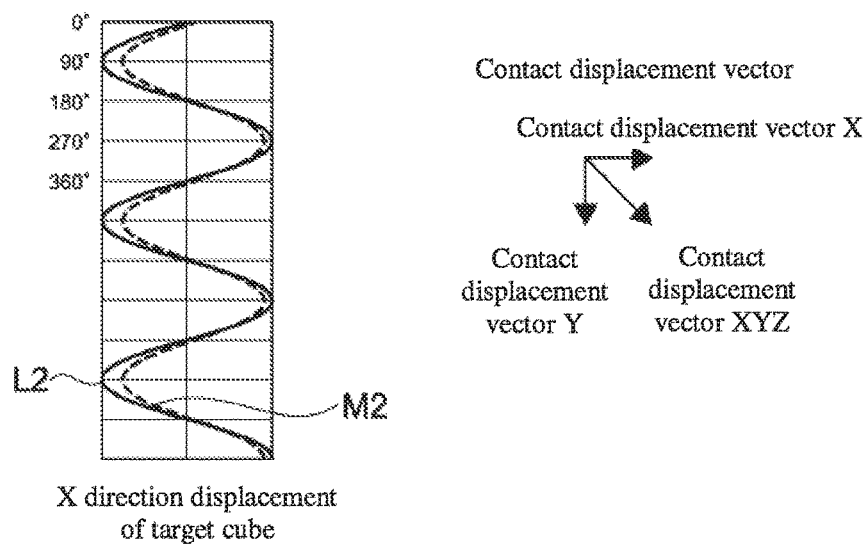

As shown in FIG. 9, in a case where the ball tip 38 touches the measured object W in a direction at a 45° angle on the XY plane, the amplitude Ax of the displacement along the X direction and the amplitude Ay of the displacement along the Y direction are both reduced by substantially the same degree (dashed lines M2 and M3).

Contact is detected when the square root sum of squares of $\Delta x$, $\Delta y$, and $\Delta z$ $(\Delta x^2+\Delta y^2+\Delta z^2)^{1/2}$ exceeds the predetermined threshold value ($\Delta x=\Delta y$, $\Delta z=0$). A value of the greater reduction amount is used as the reduction amounts $\Delta x$ and $\Delta y$.

The depression amount and contact orientation in the X and Y directions are calculated similarly to the description of the example shown in FIG. 8. Also, as shown in FIG. 9, the contact displacement vectors X and Y are defined. By compiling the contact displacement vectors X and Y, the contact displacement vector XYZ is generated. As a result, the depression amount, contact direction, and contact orientation are calculated as $(\Delta x^2+\Delta y^2)^{1/2}$, a direction along a leftward 45° angle, and rightward-by-forward, respectively.

In a case where the ball tip 38 touches the measured object W at an angle other than 45° in the XY plane, the reduction amount $\Delta x$ of the amplitude Ax of the displacement along the X direction and the reduction amount $\Delta y$ of the amplitude Ay of the displacement along the Y direction may vary depending on the contact angle (contact direction). Even in such a case, the contact displacement vectors X and Y are defined and the contact displacement vector XYZ is generated based on the reduction amounts $\Delta x$ and $\Delta y$. Accordingly, the depression amount, contact direction, and contact orientation can be calculated.

A method of detecting the magnitude of displacement due to contact, contact direction, and contact orientation in three-dimensional space is not limited to that described above. For example, the size and reduction amount of amplitude in each direction may instead be compared to a predetermined threshold value. Also, a sum of the size of amplitude, a sum of the reduction amount, and the like in each direction may be used instead. Also, the contact direction and the like may instead be calculated based on a proportion (ratio) of the reduction amounts in each direction. In addition, any desired algorithm may be employed.

In this example, a case is considered where the ball tip 38 is oscillated along only the Z direction to perform a measurement. For example, as shown in FIG. 7, in a case where the ball tip 38 touches the measured object W along the Z direction, the direction of oscillation displacement matches the contact direction, and therefore contact occurs as an impact and the contact point is treated as a displacement limit for the oscillation amplitude, and therefore contact can be detected with sufficient sensitivity.

Figure 10:
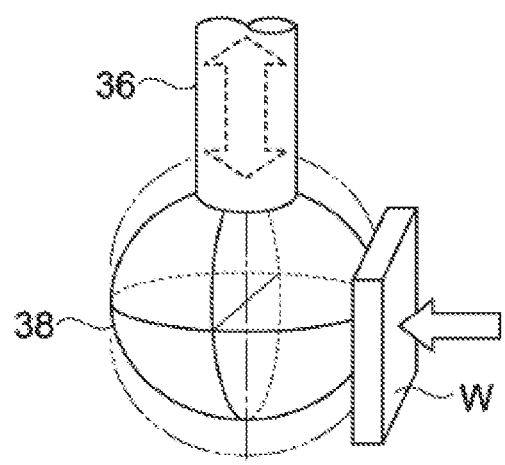
FIG. 10 is an explanatory diagram illustrating an issue arising when the ball tip oscillates only in the Z direction.

However, as shown in FIG. 10, when the stylus 36, which extends in the Z direction, comes into contact with the measured object W in the horizontal direction, the force causing a change in the oscillation state of the ball tip 38, which oscillates in the Z direction, is a friction force between the ball tip 38 and the measured object W. Given this, changes in the oscillation state due to contact are readily influenced by a friction state, and contact detection does not have stable sensitivity. In other words, in a case where oscillation occurs only in the Z direction, sensitivity to contact between the ball tip 38 and the measured object W becomes direction dependent and a bias may emerge in a measured value due to the contact direction.

Furthermore, with a single-axis-only oscillating contact detection sensor, a direction of contact with the measured object W in the measurement space cannot be detected. Therefore, the three-dimensional coordinate measuring apparatus cannot act as a contact detection sensor for 3D scanning measurement autonomously determining a scan direction based on the direction of contact with the measured object W.

In contrast, in the probe head 100 according to the present embodiment, the measuring member 31, which is supported by the first diaphragm 32a and the second diaphragm 32b, is oscillated along the Z direction by the Z oscillating mechanism 41. In addition, the target cube 47, which is arranged at a middle portion between the first diaphragm 32a and the second diaphragm 32b, is oscillated along the X and Y directions by the X oscillating mechanism 48 and the Y oscillating mechanism 50, respectively.

Accordingly, a periodic tapping-like contact(tapping more) with the measured object W may occur in any of the XYZ directions and the change in the oscillation state due to the contact can be detected with an extremely high level of sensitivity. Specifically, stable contact detection that is not dependent on the contact direction is possible.

As shown in FIG. 6, in the present embodiment, oscillation is imparted to the target cube 47 such that the ball tip 38 makes a circular motion in the XY plane. Accordingly, dependency on the contact direction can be sufficiently mitigated in all directions.

In addition, the direction of contact and the orientation of contact between the ball tip 38 and the measured object W can be detected stably and with a high degree of accuracy, thus enabling the present embodiment to behave as a probe head for 3D scanning measurement.

In addition, in a typical scanning probe measurement, there is continuous contact with a measured object surface. In contrast, in the probe head 100, contact is periodic in all directions, using a tapping mode. Accordingly, fluctuation in a coefficient of dynamic friction between the ball tip 38 and the measured object W, an influence of viscoelasticity and adsorption force of the surface of the measured object W, and the like can be greatly reduced. In other words, a dithering vibration effect can be achieved, enabling extremely accurate contact detection.

Also, because oscillation is applied without contact in each direction, a change in the oscillation state of the ball tip 38 or the like due to noise, external disturbances, or the like when oscillation is applied can be sufficiently inhibited. In other words, a change in the oscillation state due to contact with the measured object W can be detected with a high degree of accuracy and sensitivity in detecting contact can be improved.

Moreover, when using a configuration such as that of the probe described in Japanese Patent Laid-open Publication No. 2004-117225, described above, an oscillation force imparted by a piezo actuator, for example, does not affect the center of gravity of a non-driven member such as a stylus. As a result, due to offset between the oscillation force and the center of gravity, a phase difference may arise between drive displacement of the actuator and displacement of the ball tip of the stylus, making application at high frequency impossible and highly accurate measurement difficult.

Without a displacement gauge on a line of the displacement due to oscillation imparted by the actuator, the oscillation amplitude and an amount of reduction in amplitude due to contact cannot be detected as displacement, and development of a highly accurate three-axis scanning measurement is difficult. Moreover, because the actuator also serves, without modification, as a support mechanism for the stylus, heat accompanying oscillation of the actuator leads to elongation and deformation, and highly accurate measurement is difficult.

In contrast, the probe head 100 includes the Z oscillating mechanism 41 on the top end of the main shaft 35. Also, the target cube 47 is provided to the middle portion between the first position P1 and the second position P2 (the pivot points). As a result, displacement of the ball tip 38 can be controlled with a high degree of accuracy. Development into a highly accurate three-axis scanning measurement, as noted above, is also facilitated. Moreover, with no deformation or the like caused by heat due to oscillation of each oscillating mechanism, highly accurate measurement is possible.

OTHER EMBODIMENTS

The present invention is not limited to the above-described embodiment, and various other embodiments can be used.

The measuring member 31 may instead be kept in balance in the Z direction by the Z oscillating mechanism 41. For example, there may be a case where the weight of the measuring member 31 increases due to use of a stylus made of a material having a large specific gravity, or a long stylus. In such a case, a force may act upward on the measuring member 31 through an electromagnetic force of the Z oscillating mechanism 41. Also, in such a state, the measuring member 31 may instead oscillate along the Z direction.

For example, the balance can be kept by applying a bias voltage appropriate for the increased weight to a median voltage of periodic alternating voltage used in oscillation for use of a standard stylus.

By performing balancing with the Z oscillating mechanism 41, excessive deflection can be prevented in the first diaphragm 32a and the second diaphragm 32b. Also, a balance weight or the like becomes unnecessary, allowing parts costs to be cut and the size of the apparatus to be reduced. An upward orientation corresponds to an orientation toward a top end opposite the ball tip 38 side.

In the above, the ball tip 38 is oscillated in a sine wave form in each of the X, Y, and Z directions. Also, oscillation is imparted such that the ball tip 38 makes a circular motion in the XY plane. There is no limitation on how a ball tip may be oscillated in each direction; such oscillation may be defined as appropriate. For example, mutually independent oscillation may be applied in each of the X, Y, and Z directions. Even in a case where sine wave form oscillation, circular motion, or the like is not performed, stable touch detection is achieved that is not dependent on the contact direction.

In a case where scanning measurement is performed, a direction of circular motion of the ball tip 38 around the Z axis (clockwise or counterclockwise) may also be selectable as desired in accordance with a scanning direction. Also, the selection may be made automatically based on the contact direction or the like. Accordingly, in addition to reducing the friction coefficient, wear to the ball tip 38 can also be reduced.

For example, in a case where the probe head 100 advances in the Y axis plus direction in a state of contact, as shown in FIG. 8, the ball tip 38 is rotated counterclockwise. In other words, the rotation direction is defined such that the ball tip 38 makes contact in the opposite direction from a direction of advancement of the probe head 100. An amount of contact time between the measured object W and the ball tip 38 can thus be shortened, enabling a reduction in wear. Of course, the present invention is not limited to this.

A type of three-dimensional coordinate measuring device to which the above-described probe head is applied is not limited. The probe head according to the present invention can be applied to various devices capable of three-dimensional coordinate measurement, such as a computer numerical control (CNC) three-dimensional coordinate measuring device, a machining center to which a touch signal probe can be installed, and the like.

The probe head according to the present technology can also be applied to any desired device as an oscillating 3D touch detection sensor. Also, all or a portion of the functions of the computer shown in FIG. 1 may be provided to the probe head instead.

It is also possible to combine at least two aspects of each of the embodiments described above. In addition, the various effects described above are merely exemplary and are not intended to limit the present invention. Other effects may also be achieved.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A probe head of a three-dimensional coordinate measuring device comprising:
   a measurer extending in a first direction;
   first and second diaphragms provided at two different positions along the measurer, at respective first and second positions, the first and second diaphragms configured to support the measurer such that the measurer displaceable in the first direction;
   a first oscillator configured to cause the measurer to oscillate along the first direction; and
   a second oscillator configured to cause a predetermined portion of the measurer between the first and second diaphragms to oscillate along each of a second direction orthogonal to the first direction, and a third direction orthogonal to both the first and second directions.

2. The probe head of the three-dimensional coordinate measuring device according to claim 1, wherein:
   the measurer further comprises a ball tip provided at a distal end of the measurer, and
   the second oscillator is configured to oscillate the predetermined portion of the measurer such that the ball tip makes a circular motion in a plane orthogonal to the first direction.

3. The probe head of the three-dimensional coordinate measuring device according to claim 1, wherein the predetermined portion is a middle portion between the first and second diaphragms.

4. The probe head of the three-dimensional coordinate measuring device according to claim 1, wherein the first and second oscillators are configured to cause the measurer to oscillate without touching the measurer.

5. The probe head of the three-dimensional coordinate measuring device according to claim 1, wherein the second oscillator comprises:
   a first oscillation applier configured to cause the predetermined portion to oscillate along the second direction; and
   a second oscillation applier configured to cause the predetermined portion to oscillate along the third direction.

6. The probe head of the three-dimensional coordinate measuring device according to claim 5, wherein:
   the first oscillator is configured to cause the measurer to oscillate at a first frequency, and
   the first and second oscillation appliers are configured to cause the predetermined portion to oscillate at a second frequency lower than the first frequency.

7. The probe head of the three-dimensional coordinate measuring device according to claim 6, wherein:
   the first oscillation applier is configured to cause the predetermined portion to oscillate in a sine wave shape, and
   the second oscillation applier is configured to cause the predetermined portion to oscillate in a sine wave shape such that a phase of the oscillation differs by 90° from the oscillation caused by the first oscillation applier.

8. The probe head of the three-dimensional coordinate measuring device according to claim 1, further comprising:
   a first detector configured to detect displacement of the measurer in the first direction; and
   a second detector configured to detect displacement of the predetermined portion in each of the second and third directions.

9. The probe head of the three-dimensional coordinate measuring device according to claim 8, wherein the first and second detectors are further configured to detect displacement of the measurer without touching the measurer.

10. The probe head of the three-dimensional coordinate measuring device according to claim 8, wherein the second detector further comprises:
    a first displacement sensor configured to detect displacement of the predetermined portion in the second direction; and
    a second displacement sensor configured to detect displacement of the predetermined portion in the third direction.

11. The probe head of the three-dimensional coordinate measuring device according to claim 1, wherein the first oscillator is configured to cause the measurer to oscillate in a state where a force is applied to the measurer from one end side of the measurer to contact a measurable object toward an opposite end side of the measurer.

12. A touch detection method comprising:
    supporting a measurer such that the measurer is displaceable in a first direction, the measurer extending in the first direction and supported by first and second diaphragms which are provided at two different positions, at respective first and second positions, on the measurer;
    oscillating the measurer along the first direction;
    oscillating, along each of a second direction orthogonal to the first direction, and a third direction orthogonal to both the first and second directions, a predetermined portion of the measurer between the first and second diaphragms;
    displacing a ball tip provided at a distal end of the measurer toward a measurable object; and
    detecting contact between the ball tip and the measureable object based on displacement of the measurer in the first direction and displacement of the predetermined portion in each of the second and third directions.

13. The touch detection method according to claim 12, wherein the detecting contact further comprises detecting a direction of the contact of the ball tip with the measurable object based on displacement of the measurer in the first direction and displacement of the predetermined portion in each of the second and third directions.

* * * * *